(12) United States Patent
Wennerström et al.

(10) Patent No.: US 9,636,617 B2
(45) Date of Patent: May 2, 2017

(54) AIR PURIFIER DEVICE WITH FAN DUCT

(71) Applicant: Blueair AB, Stockholm (SE)

(72) Inventors: Johan Wennerström, Stockholm (SE);
Elin Engberg, Stockholm (SE)

(73) Assignee: BLUEAIR AB, Stockholm (SE)

( * ) Notice: Subject to any disclaimer, the term of this patent is extended or adjusted under 35 U.S.C. 154(b) by 0 days.

(21) Appl. No.: 14/548,655

(22) Filed: Nov. 20, 2014

(65) Prior Publication Data
US 2015/0231543 A1 Aug. 20, 2015

(30) Foreign Application Priority Data

Feb. 18, 2014 (EP) .................................... 14155645

(51) Int. Cl.
*B01D 46/00* (2006.01)
*F04D 29/54* (2006.01)
(Continued)

(52) U.S. Cl.
CPC ..... *B01D 46/0032* (2013.01); *B01D 46/0039* (2013.01); *F04D 13/06* (2013.01);
(Continued)

(58) Field of Classification Search
CPC ..... B01D 46/00; F04D 29/545; F04D 29/547; F04D 29/526
(Continued)

(56) References Cited

U.S. PATENT DOCUMENTS 521,862 A * 6/1894 McConnell ........... F04D 29/545
415/222
1,502,862 A * 7/1924 Menk .................... F04D 29/526
237/50
(Continued)

FOREIGN PATENT DOCUMENTS

CN 2130247 Y 4/1993
CN 101010142 A 8/2007
(Continued)

OTHER PUBLICATIONS

Wennerström et al., U.S. Appl. No. 14/548,551, entitled "Air Purifier Device With Coupling Mechanism," filed Nov. 20, 2014.
(Continued)

*Primary Examiner* — Amber R Orlando
*Assistant Examiner* — Britanny Precht
(74) *Attorney, Agent, or Firm* — Buchanan Ingersoll & Rooney P.C.

(57) ABSTRACT

An air purifier device is provided including a fan arranged to produce an air flow through the air purifier device, and a fan duct for guiding the air flow produced by the fan. The fan duct extends in an upright direction of the air purifier device. The air purifier device further includes an air intake arranged below a lower end of the fan duct, and an exhaust arranged at an upper end of the fan duct so as to exhaust purified air in an upward direction from the air purifier device when the air purifier device is in use. The fan duct is flared in direction from an intermediate portion of the fan duct towards both it (Continued)

ends, and the fan is arranged at least partly in the intermediate portion. A facilitated circulation of air through the room and through the air purifier device standing in the room is provided.

9 Claims, 6 Drawing Sheets

(51) Int. Cl.
*F04D 29/52* (2006.01)
*F04D 13/06* (2006.01)

(52) U.S. Cl.
CPC ......... *F04D 29/526* (2013.01); *F04D 29/545* (2013.01); *F04D 29/547* (2013.01)

(58) Field of Classification Search
USPC .......................................................... 55/471
See application file for complete search history.

(56) References Cited

U.S. PATENT DOCUMENTS

| | | | | |
|---|---|---|---|---|
| 1,921,153 | A * | 8/1933 | Cantwell | F04D 25/14 415/146 |
| 2,415,621 | A * | 2/1947 | Arnhym | F04D 29/526 261/103 |
| 3,256,680 | A | 6/1966 | Coombs | |
| 3,937,189 | A * | 2/1976 | Beck | F04D 29/547 123/41.49 |
| 4,634,342 | A * | 1/1987 | Rodewald | F04D 29/545 239/77 |
| 4,730,980 | A * | 3/1988 | Hughes | F04D 19/022 415/143 |
| 4,749,390 | A | 6/1988 | Burnett et al. | |
| 4,781,526 | A | 11/1988 | Mead et al. | |
| 5,266,090 | A | 11/1993 | Burnett | |
| 5,422,795 | A * | 6/1995 | Liu | 362/96 |
| 5,452,713 | A * | 9/1995 | Vipond | F04D 29/545 128/202.27 |
| 5,601,636 | A * | 2/1997 | Glucksman | 96/63 |
| 5,615,999 | A * | 4/1997 | Sukup | F04D 29/545 415/182.1 |
| 5,641,343 | A | 6/1997 | Frey | |
| 5,753,000 | A | 5/1998 | Chiu et al. | |
| 5,753,002 | A | 5/1998 | Glucksman | |
| 5,803,709 | A * | 9/1998 | Matthews | F04D 29/545 415/182.1 |
| 5,997,619 | A | 12/1999 | Knuth | |
| 6,174,340 | B1 | 1/2001 | Hodge | |
| 6,447,586 | B1 | 9/2002 | Campbell | |
| 6,450,760 | B1 * | 9/2002 | Furukawa | F04D 29/384 415/119 |
| 6,989,051 | B2 | 1/2006 | Parisi et al. | |
| 7,074,250 | B1 | 7/2006 | Chipner et al. | |
| 7,537,647 | B2 | 5/2009 | Adair et al. | |
| 7,806,952 | B2 | 10/2010 | Fox et al. | |
| 2002/0073664 | A1 | 6/2002 | Campbell et al. | |
| 2002/0088213 | A1 | 7/2002 | McSweeney et al. | |
| 2003/0202879 | A1 * | 10/2003 | Huang | F04D 29/526 415/220 |
| 2004/0163542 | A1 * | 8/2004 | Huang | 96/222 |
| 2004/0182054 | A1 | 9/2004 | Kaylan et al. | |
| 2006/0016333 | A1 | 1/2006 | Taylor et al. | |
| 2006/0016335 | A1 | 1/2006 | Cox et al. | |
| 2006/0053758 | A1 * | 3/2006 | Wu et al. | 55/471 |
| 2006/0110272 | A1 * | 5/2006 | Moore | F04D 29/545 417/423.15 |
| 2006/0201119 | A1 * | 9/2006 | Song | 55/471 |
| 2006/0277875 | A1 | 12/2006 | Schuld | |
| 2007/0070602 | A1 | 3/2007 | Huang | |
| 2007/0277487 | A1 * | 12/2007 | Thurin et al. | 55/471 |
| 2008/0028733 | A1 * | 2/2008 | Paterson et al. | 55/471 |
| 2008/0066620 | A1 | 3/2008 | Wang | |
| 2011/0064595 | A1 | 3/2011 | Kuang | |
| 2011/0100221 | A1 | 5/2011 | Wu | |
| 2012/0111188 | A1 | 5/2012 | Zanganeh et al. | |
| 2012/0180666 | A1 * | 7/2012 | Lim et al. | 96/108 |
| 2015/0231542 | A1 | 8/2015 | Wennerström et al. | |
| 2015/0231645 | A1 | 8/2015 | Engberg et al. | |
| 2015/0354578 | A1 * | 12/2015 | Avedon | F04D 13/06 417/53 |

FOREIGN PATENT DOCUMENTS

| | | |
|---|---|---|
| CN | 102 039 222 A | 5/2011 |
| CN | 204602410 U | 9/2015 |
| GB | 449903 A | 6/1936 |
| GB | 488781 A | 7/1938 |
| JP | S 61-153159 A | 7/1986 |
| JP | S 62-22937 A | 1/1987 |
| RU | 2 259 862 C2 | 9/2005 |
| SE | 9 804 475 L | 6/2000 |
| WO | WO 95/34366 A1 | 12/1995 |
| WO | WO 98/50162 A1 | 11/1998 |
| WO | WO 00/30732 A1 | 6/2000 |
| WO | WO 2006/071503 A1 | 7/2006 |
| WO | WO 2013/165242 A1 | 11/2013 |
| WO | WO 2014/007558 A1 | 1/2014 |

OTHER PUBLICATIONS

Engberg et al., U.S. Appl. No. 14/548,364, entitled "Air Purifier Device With Ionizing Means," filed Nov. 20, 2014.
Office Action issued by the U.S. Patent and Trademark Office in U.S. Appl. No. 14/548,551, mailed May 27, 2016, 14 pages.
Extended European Search Report mailed Jul. 7, 2014 in EP 14155644.9, 6 pages, EPO, Munich, DE.
Extended European Search Report mailed Jul. 7, 2014 in EP 14155645.6, 6 pages, EPO, Munich, DE.
Extended European Search Report mailed Aug. 5, 2014 in EP 14155642.3, 8 pages, EPO, Munich, DE.
Official Action issued in Chinese Patent Application 201510015117.1, mailed Jun. 27, 2016, 10 pages, State Intellectual Property Office of the P.R.C., CN, and English-language translation (12 pages).

* cited by examiner

AIR PURIFIER DEVICE WITH FAN DUCT

CROSS REFERENCE TO RELATED APPLICATIONS

The present application claims the benefit of European Application No. 14155645.6, filed on Feb. 18, 2014. The entire contents of European Application No. 14155645.6 are hereby incorporated herein by reference in their entirety.

FIELD OF THE INVENTION

The present invention generally relates to the field of air purifier devices. In particular, the present invention relates to fan ducts in air purifier devices.

BACKGROUND OF THE INVENTION

Air purifier devices are used for cleaning indoor air from pollutants. Conventional air purifier devices comprise a fan arranged to produce an air flow through the air purifier device and a filter arranged to filter the air flow produced by the fan, whereby air-borne particles in the air flow adhere to the filter and purified air is exhausted from the air purifier device.

The air cleaning performance of air purifier devices is normally expressed in clean air delivery rate (CADR), which defines the cubic feet per minute (CFM) of air that has had substantially all the particles (such as between 95% and 100% of the particles) of a given size removed.

A drawback with known air purifier devices is that the air cleaning performance may be impaired due to poor circulation of air in the room provided by the air purifier device. For example, the circulation of air may not be able to reach some portions of a room forming dead spaces, where the air consequently is not cleaned.

SUMMARY OF THE INVENTION

It would be advantageous to achieve an air purifier device overcoming, or at least alleviating, the above mentioned drawbacks. In particular, it would be desirable to enable an air purifier device with improved air cleaning performance. To better address one or more of these concerns, an air purifier device having the features defined in the independent claim is provided. Preferable embodiments are defined in the dependent claims.

Hence, according to an aspect, an air purifier device is provided. The air purifier device comprises a fan arranged to produce an air flow through the air purifier device, and a fan duct for guiding the air flow produced by the fan. The fan duct extends in an upright direction of the air purifier device. The air purifier device further comprises an air intake arranged below a lower end of the fan duct, and an exhaust arranged at an upper end of the fan duct so as to exhaust purified air in an upward direction from the air purifier device when the air purifier device is in use. The fan duct is flared in direction from an intermediate portion of the fan duct towards both it ends, and the fan is arranged at least partly in the intermediate portion.

With the present aspect, the air flowing into the air purifier device converges towards the intermediate portion of the fan duct, and is exhausted divergently upwards. The convergent inflow of air from below in combination with the divergent outflow upwards provides a facilitated circulation of air through the room and through the air purifier device standing in the room. Air from a greater part of the room is enabled to pass the air purifier device, whereby the air cleaning performance of the air purifier device is improved.

The fan duct may be formed by a piece of conduit (or pipe) in which the fan is arranged. In an embodiment, the fan may be arranged with its axial direction along (such as substantially parallel with) the upright direction of the air purifier device (i.e. along the extension direction of the fan duct) for facilitating the air flow through the fan duct.

According to an embodiment, the transitions between the intermediate portion and the flared portions of the fan duct may be smooth. Hence, the transitions between the intermediate portion and the flared portions are (substantially) free from any sharp corners or angles, whereby the air resistance is reduced in the fan duct and the air circulation is further facilitated in the room, which in turn improves the air cleaning performance of the air purifier device.

According to an embodiment, the fan may be centered (in a longitudinal direction) in the intermediate portion of the fan duct. For example, the fan may be arranged in the narrowest portion of the fan duct. According to a further embodiment, the length of the intermediate portion may correspond to (such as being substantially the same as) the height of the blades of the fan. Hence, the fan blades are surrounded by the intermediate portion, but not the flared portions. With each one of the present embodiments, an increased amount of air passes through the fan instead of beside the fan, which facilitates air circulation through the air purifier device. Further, if the length of the intermediate portion corresponds to the height of the blades of the fan, the fan duct (and thus also the air purifier device) is more compact compared to if the length of the intermediate portion is substantially longer than the height of the fan blades.

According to an embodiment, the intermediate portion of the fan duct may have a circular cross-section (in a horizontal plane). Further, the end portions of the fan duct may have square-like cross-sections. For example, the cross-sections of the end portions may be shaped as quadrates with rounded corners. With the present embodiment, the fan duct may be adapted to a substantially box-shaped outline of the air purifier device, while still enabling an improved air circulation. The transitions between the circular intermediate portion and the square-like end portions may preferably be smooth, i.e., without any sharp corners or the like.

According to an embodiment, the air intake may be arranged to take in air from at least one lateral side of the air purifier device. For example, the air intake may be arranged in one or more side (or lateral) walls of the air purifier device. The air intake may extend downwards from the lower end of the fan duct. Hence, air is taken in from the side and is redirected in the fan duct to be exhausted divergently upwards, whereby air circulation in the room is further improved and the cleaning performance of the air purifier device is enhanced.

According to an embodiment, the air intake may be arranged to take in air circumferentially around the lateral sides of the air purifier device. Hence, air may be taken in from substantially 360 degrees around the air purifier device, and hence from all around the room. The circumferential air intake in combination with the flared intake end of the fan duct facilitates air to circulate from all around the room towards the intermediate portion, whereby the air circulation in the room is further improved and the clean air delivery rate is enhanced.

According to an embodiment, the air purifier device may further comprise an inlet grille arranged at the lower end of the fan duct, and an exhaust grille arranged at the upper end of the fan duct. The air intake area of the inlet grille may be larger than the air exhaust area of the exhaust grille. The inventors have realized that with an arrangement of the fan duct and the fan according to the present aspect (i.e. with the fan duct extending in the upright direction of the air purifier device), there is a risk of negative pressure occurring between the inlet grille and the fan. The occurrence of such a negative pressure puts a higher load on the fan and increases power consumption and noise level of the fan. By having an air intake area of the inlet grille being larger than the air exhaust area of the exhaust grille, such a risk is reduced. Further, the inlet and exhaust grilles may be arranged for preventing user access to the fan.

According to an embodiment, the air purifier device may further comprise a filter arranged to filter the air flow produced by the fan. The filter may be arranged on an upstream side of the fan duct (i.e. below the lower end of the fan duct), whereby air turbulence is reduced at the exhaust, which improves the air circulation in the room. The air purifier device may further comprise an ionizing device arranged on a downstream side of the fan so as to ionize particles in the air to be exhausted from the air purifier device. Hence, the ionizer may ionize particles, which are subsequently exhausted from the ionizing device into the room, where they are circulated back to the intake of the air purifier device and filtered by the filter. The filter may preferably comprise a material facilitating attraction of the ionized particles, such as polypropylene.

It is noted that embodiments of the invention relates to all possible combinations of features recited in the claims.

BRIEF DESCRIPTION OF THE DRAWINGS

This and other aspects will now be described in more detail in the following illustrative and non-limiting detailed description of embodiments with reference to the appended drawings.

All the figures are schematic, not necessarily to scale, and generally only show parts which are necessary in order to elucidate the embodiments, wherein other parts may be omitted. Like reference numerals refer to like elements throughout the description and drawings.

DETAILED DESCRIPTION OF EMBODIMENTS

Figure 1:
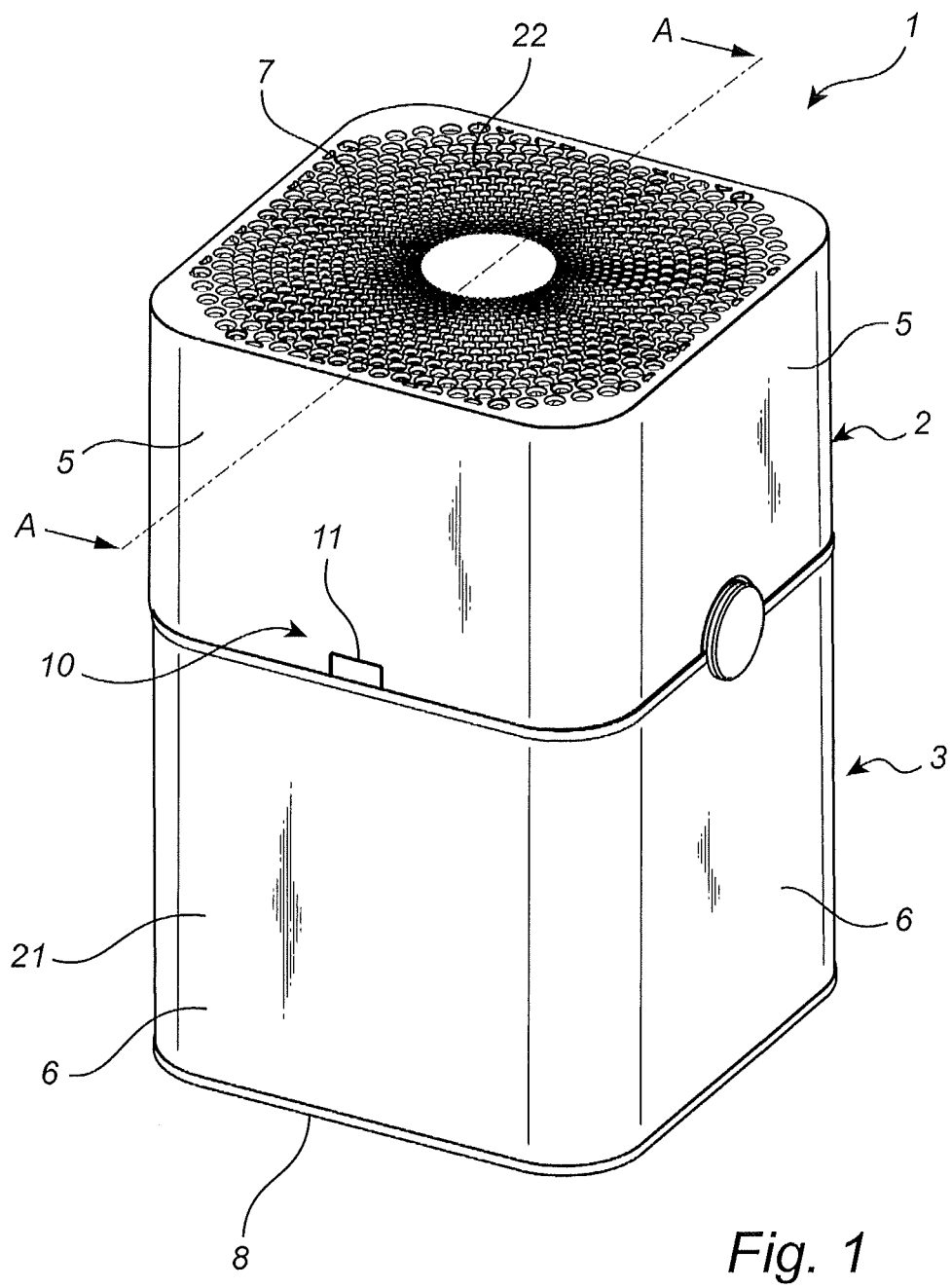
FIG. 1 shows an air purifier device.
Figure 2:
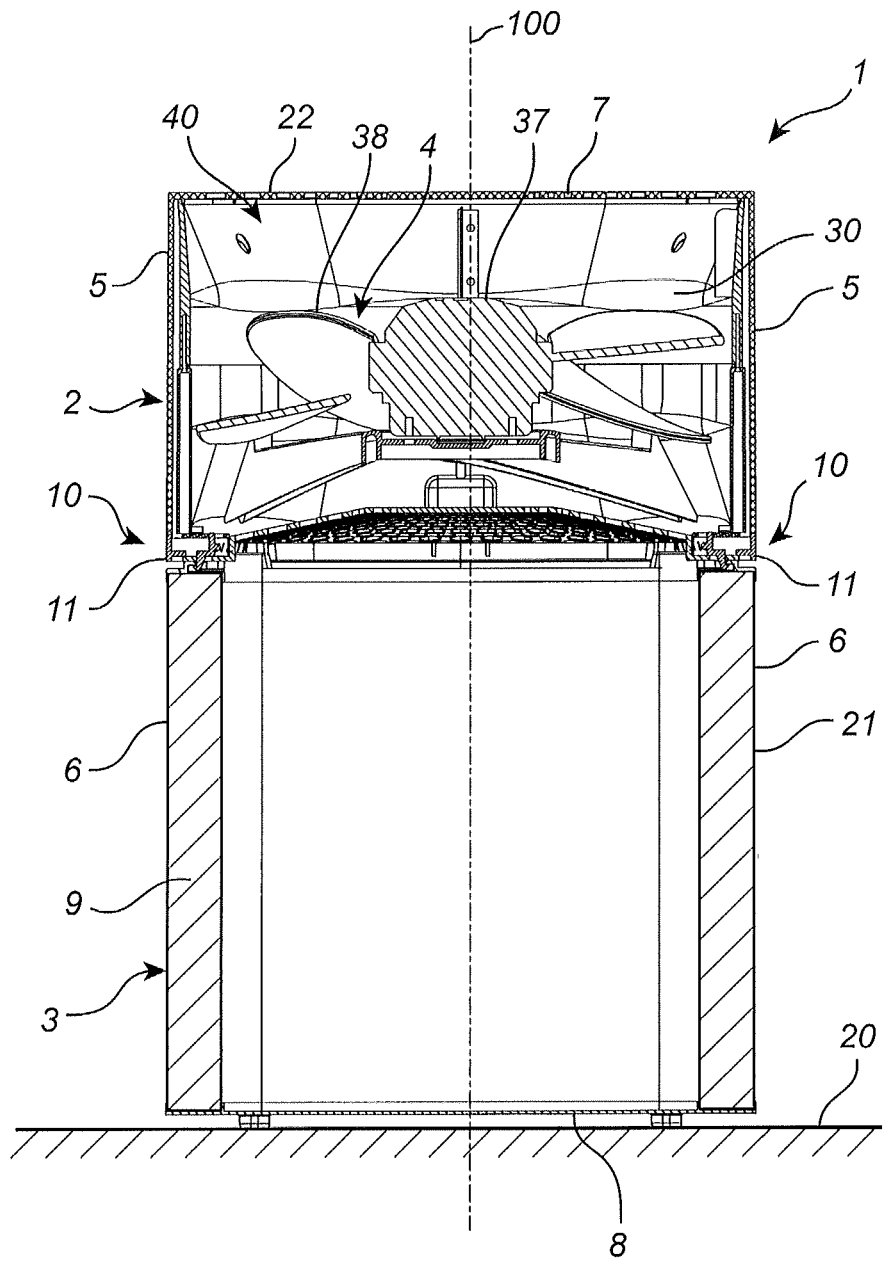
FIG. 2 is a cross-section taken along A-A in FIG. 1.

FIGS. 1 and 2 show an example of an air purifier device 1, which may be suitable for purifying air in indoor spaces, such as rooms in homes and the like domestic environments. The air purifier device 1 may comprise a fan 4 for producing an air flow through the air purifier device 1 and a filter 9 for filtering the air flow produced by the fan 4. The air purifier device 1 may further comprise an ionizing device 40 for ionizing air borne particles in the air flow produced by the fan 4. Preferably, the filter 9 may comprise a dielectric material, such as polypropylene, which facilitates attraction of ionized particles to the filter 9. For example, the filter 9 may be a filter as described in WO98/50162.

The air purifier device has a longitudinal (or vertical) axis 100 extending in an upright direction of the air purifier device 1 when the air purifier device 1 is positioned on the support surface 20 for use. In an embodiment, the air purifier device 1 may have a box-like shape, optionally with one or more rounded edges. For example, the air purifier device 1 may have a square-shaped cross-section (in a horizontal plane) with rounded corners, as illustrated in FIG. 1. Other shapes of the air purifier device 1 may also be envisaged, such as a cylindrical shape. A side wall may extend between a bottom wall 8 adapted to face, and preferably be supported on, the support surface 20 and a top wall 7. Preferably, opposite outer sides of the side wall may be substantially parallel with each other and transverse (such as perpendicular) to the bottom wall 8.

In an embodiment, the air purifier device 1 may be structurally separated into two parts: a filter unit 3, in which the filter 9 is arranged and a fan unit 2, in which the fan 4 may be arranged. The fan unit 2 may be arranged on top of the filter unit 3. For example, the fan unit 2 and the filter unit 3 may both be box-shaped, thereby together forming the box-shaped air purifier device 1. The side wall of the air purifier device 1 may be formed by the side wall 5 of the fan unit 2 and the side wall 6 of the filter unit 3. The filter 9 may be arranged along the side wall of the air purifier device 1, such as circumferentially around the side wall 6 of the filter unit 3. The filter 9 may be protected by a grid arranged outside the filter 9 so as to enclose the filter 9 in the filter unit 3. Optionally, the grid may on its outside be covered by a fabric cover.

In an embodiment, at least a portion of the side wall 6 of the filter unit 3 may form an air intake 21 of the air purifier device 1. Preferably, the air intake 21 may extend circumferentially around the air purifier device 1 so as to be able to take in air from several lateral directions, such as preferably approximately 360 degrees around the air purifier device 1. For example, the air intake 21 may be formed by all four sides of the side wall 6 of the filter unit 3.

In an embodiment, the air purifier device 1 may comprise an exhaust 22 arranged to exhaust air upwards (i.e. roughly along the longitudinal axis 100) from the air purifier device 1. For example, the exhaust 22 may be arranged in the top wall 7, such as in the form of an exhaust grille, as illustrated in FIGS. 1 and 2. The exhaust grille may preferably be free from openings larger than 12 mm, such as free from openings larger than 11 mm, thereby preventing a user's finger from accessing the fan 4.

In an embodiment, the air purifier device 1 may comprise a fan duct 30, in which the fan 4 may be arranged. For example, the fan duct 30 may be arranged in the fan unit 2. The fan duct 30 may extend in an upright direction of the air purifier device 1, i.e. along the longitudinal axis 100 of the air purifier device 1, towards the exhaust 22. The fan duct 30 may be formed by a piece of conduit arranged within the air purifier device 1 (as illustrated in FIG. 2).

Figure 3:
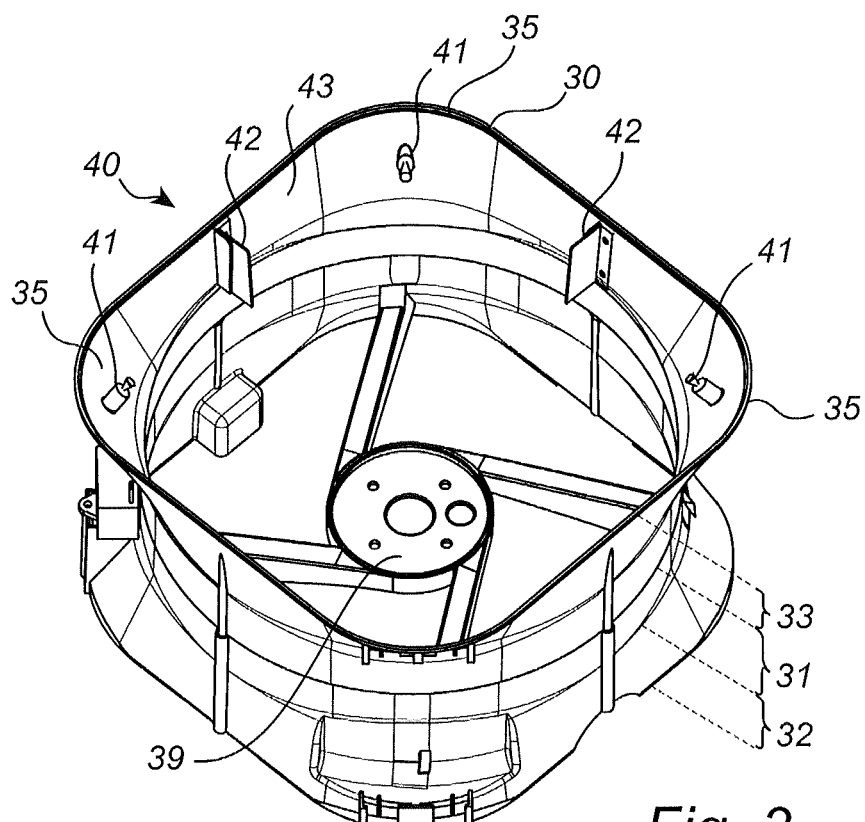
FIG. 3 is a perspective view of a fan duct and an ionizing device of the air purifier device.
Figure 4:
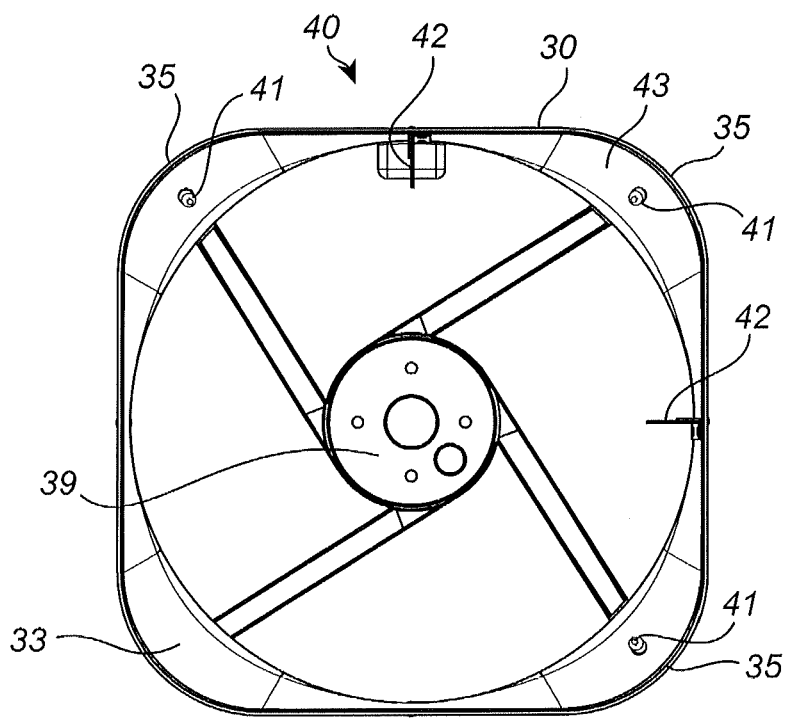
FIG. 4 is a top view of the fan duct and the ionizing device shown in FIG. 3.

Embodiments of the fan duct 30 will be described in more detail with reference to FIGS. 3 and 4. FIG. 3 is a perspective view of the fan duct 30, which for the sake of clarity is separated from the air purifier device 1, and FIG. 4 is a top view of the fan duct 30.

The fan duct 30 may comprise an intermediate portion 31, an upper flared portion 33 and a lower flared portion 32. Hence, the fan duct 30 is flared towards both its ends, whereby the intermediate portion 31 is narrower than the end portions of the fan duct 30. Preferably, the inner walls of the fan duct 30 may be smooth and, thus, free form sharp edges, corners or the like. In particular, the transition between the intermediate portion 31 and the flared portions 31, 32 may be smooth.

The fan 4 may be arranged at least partly within the intermediate portion 31. The diameter of the intermediate portion 31 may be adapted to (such as be slightly smaller than) the diameter of the fan 4. Preferably, the height (i.e. in direction along the longitudinal axis 100) of the blades 38 of the fan 4 may correspond to, or be slightly shorter than, the height (or length) of the intermediate portion 31 for reducing the amount of air passing beside instead between the blades 38 of the fan 4. Hence, the blades 38 of the fan 4 may preferably be completely contained in the intermediate portion 31. For example, the fan 4 may be centered (at least in the direction of the longitudinal axis 100) in the intermediate portion. The fan duct 30 may comprise a support structure 39 arranged to support the fan 4 in the fan duct 30.

In an embodiment, the intermediate portion 31 may have a circular cross-section (in the horizontal plane), thereby being adapted to the circular operation pattern of the fan 4. Further, the fan duct 30 may have square shaped ends, preferably with rounded corners 35, as illustrated in FIGS. 3 and 4. Preferably, the circular shape of the intermediate portion 31 may gradually transform into the square-like shape along the flared portions towards the ends of the fan duct 30.

In an embodiment, an inlet grille 36 (shown in FIG. 2) may be arranged at the lower end of the fan duct 30, which, in similarity with the exhaust grille (at the exhaust 22), preferably may be free from openings larger than 12 mm, such as free from openings larger than 11 mm, thereby preventing a user's finger from accessing the fan from the lower side of the filter unit 2. Further, the air intake area of the inlet grille 36 may be larger than the air exhaust area of the exhaust grille, for example by comprising more and/or bigger holes than the exhaust grille.

In an embodiment, the air purifier device 1 may comprise an ionizing device 40 arranged to ionize air borne particles in the air flow through the air purifier device 1. The Ionizing device 40 may e.g. be positioned in the fan duct 30, preferably on a downstream side of the fan 4. The ionizing device 40 may thus be positioned just before the exhaust 22 (with reference to the air flow direction).

Alternatively, the air purifier device may be arranged such that the ionizing device is arranged on an upstream side of the filter and/or the fan (not shown).

In an embodiment, the ionizing device 40 may comprise one or more emitter electrodes 41 connectable to a source of electric potential and one or more collector plate electrodes 42 connectable to ground, or virtual ground, potential, and arranged in a chamber (which may be referred to as an ionizing chamber). The emitter electrodes 41 e.g. may be formed as brush electrodes and/or pin electrodes e.g. made of carbon. The collector plate electrodes 42 may e.g. comprise pieces of sheet metal attached to the side wall 43. The chamber may e.g. be formed by the upper end portion 33 of the fan duct 30. The chamber (e.g. the entire fan duct 30) may be made of (such as molded in) plastics. The collector plate electrodes 42 may extend from a side wall 43 of the chamber and inwards in the chamber (such as substantially towards the middle of the chamber), and preferably along (such as substantially parallel with) a main direction of the air flow (such as substantially along the longitudinal axis 100 of the air purifier device 1).

In the present example, the ionizing device 40 may comprise three emitter electrodes 41 and two collector plate electrodes 42, which provides an improved electrical field for ionizing air borne particles in the air flow. Preferably, a first one of the emitter electrodes 41 may be arranged opposite to a second one of the emitter electrodes 41, and a first one of the two collector plate electrodes 42 may be arranged between the first emitter electrode and a third one of the emitter electrodes 41. Further, a second one of the two collector plate electrodes 42 may be arranged between the second emitter electrode and the third emitter electrode. In the present example, the three emitter electrodes 41 may preferably be positioned in three of the four rounded corners 35 (forms jutting portions) of the square-like shaped chamber, and each collector plate electrode 42 may be positioned in-between two emitter electrodes 41, such as on one of the sides of the four-sided chamber, as illustrated in FIGS. 3 and 4. Hence, the emitter electrodes 41 and the collector plates 42 may be positioned in an asymmetric manner in the chamber, which has the surprising effect of an improved ionizing rate achieved by the ionizing device 40. Preferably, the distance between an emitter electrode 41 and the motor 37 (shown in FIG. 2) of the fan 4 may be larger than the distance between an emitter electrode 41 and one of the collector plates 42, which e.g. may be achieved by the arrangement of the emitter electrodes 41 and the collector plates 42 according to the present example.

When an electric potential is applied to the emitter electrodes 41, an electromagnetic (EM) field is formed generally between the emitter electrodes 41 and the collector plate electrodes 42. When molecules and/or air borne particles pass the EM field in the chamber, they may be ionized. With the ionizing device 40 according to the present example, the magnitude of the EM field strength is larger towards the side wall 43 than in the middle of the chamber, which is advantageous in that the EM field is concentrated where most of the air passes the chamber and the risk of the motor 37 of the fan being charged by the EM field is reduced.

Preferably, the air purifier device 1 may be configured to apply a constant negative electric potential to the emitter electrodes 41, whereby mostly negative ions (anions) are created. Preferably, an electric potential around −7 kV may be applied. Lower electric potentials, such as around −20 kV may increase the output of ozone. However, applying an alternating voltage over emitter-collector pairs comprised in the air purifier device may alternatively be envisaged.

Figure 5:
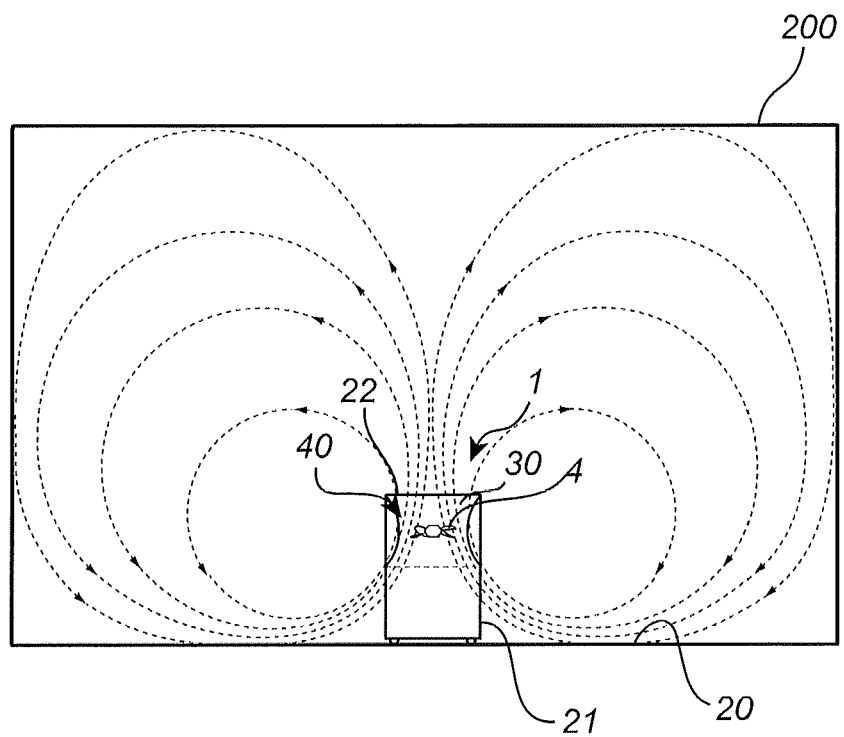
FIG. 5 schematically illustrates the air purifier device in operation in a room.

With reference to FIG. 5, an example of operation of the air purifier device 1 will be described. FIG. 5 shows the air purifier device 1 positioned on a floor 20 in a room 200. Preferably, the air purifier device 1 may be positioned to be spaced apart from the walls of the room 200. When the fan 4 operates, air is taken in through the air intake 21 laterally around the lower part of the air purifier device 1 and is then conducted upwards by the fan duct 30 to the exhaust 22 where the air is exhausted partly upwards and partly laterally. The shape of the fan duct 30 having flared end portions promotes the air circulation in the room 200 as illustrated in FIG. 5, as the air is directed to better follow the room shape. Air is directed slightly upwards and sideways from the exhaust 22, is guided along the ceiling, the walls and the floor 20 of the room 200 and is then taken in slightly from below and sideways via the air intake 21, whereby turbulence in the air circulation in the room can be reduced. The improved air circulation in turn improves the air purification in the room 200.

The air may pass the ionizing device 40 before exiting the exhaust 22, whereby air borne particles in the air flow may be ionized. Some of the ionized particles may then adhere to the collector plate electrodes 42 and some may follow the air flow out of the air purifier device 1 and back to the air intake 21 of the air purifier device 1 whereupon the particles adhere to the filter. Some ionized particles may be attracted to each other and form clusters, which may be retrieved to the air purifier device 1 by the air flow. Due to the improved air circulation achieved by the fan duct 30, an increased amount of the exhausted ionized particles and clustered particles are retrieved to the air purifier device 1 instead of adhering to the ceiling, walls and/or floor of the room 200, where they may be neutralized. Some of the particles adhered to the walls in that way may subsequently dislodge from the wall and pollute the air again. Further, as the ionizing device 40 is arranged downstream relative to the fan 4, the fan 4 is less (or even not at all) charged by the ionized particles.

In an embodiment, the air purifier device 1 may comprise a coupling mechanism 10 for securing the fan unit 2 on top of the filter unit 3. The coupling mechanism 10 will be described in more detail with reference to FIGS. 6 and 7.

Figure 6:
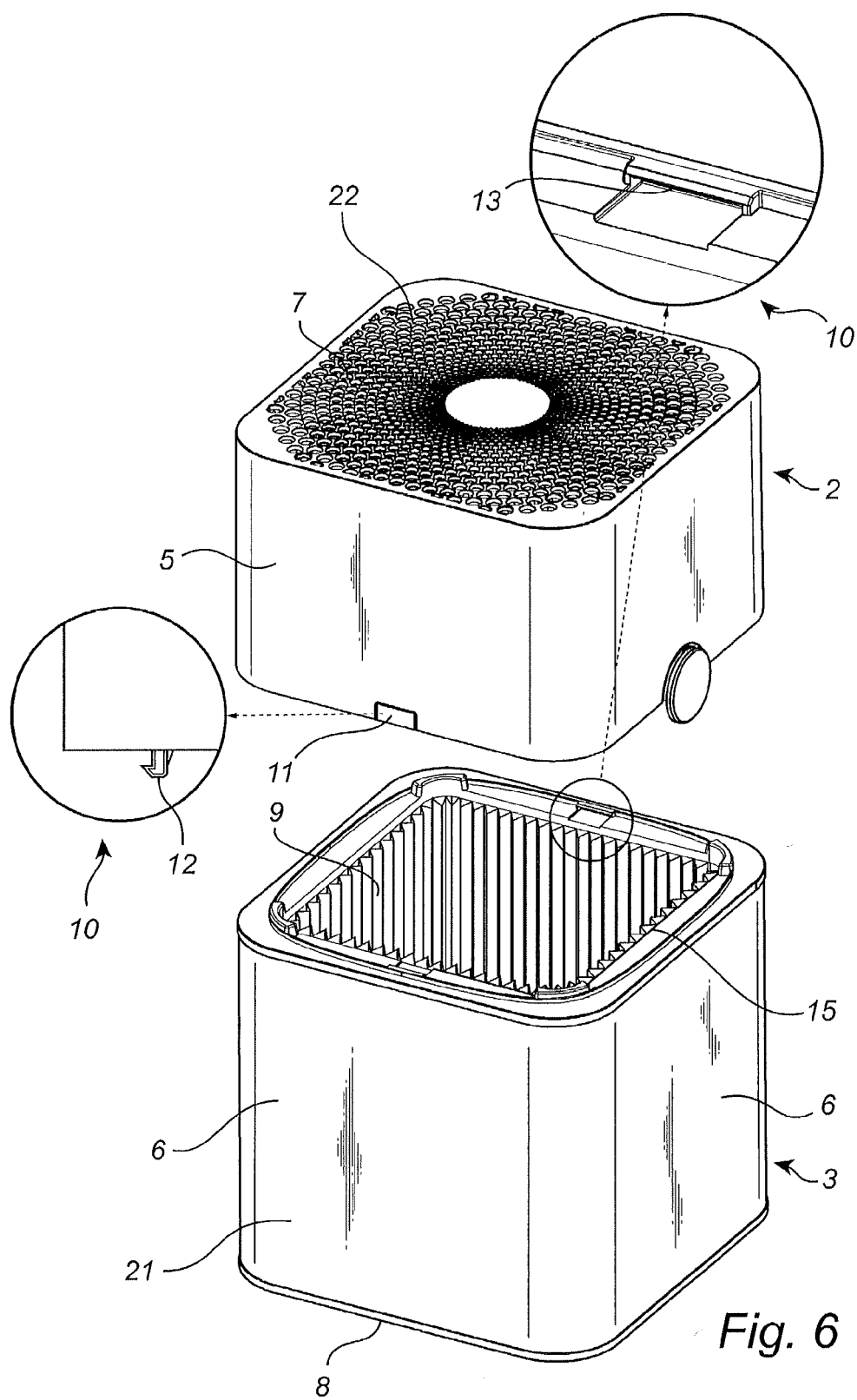
FIG. 6 shows the air purifier device of FIG. 1 with a fan unit separated from a filter unit of the air purifier device and enlargements of engagement parts of a coupling mechanism of the air purifier device.
Figure 7:
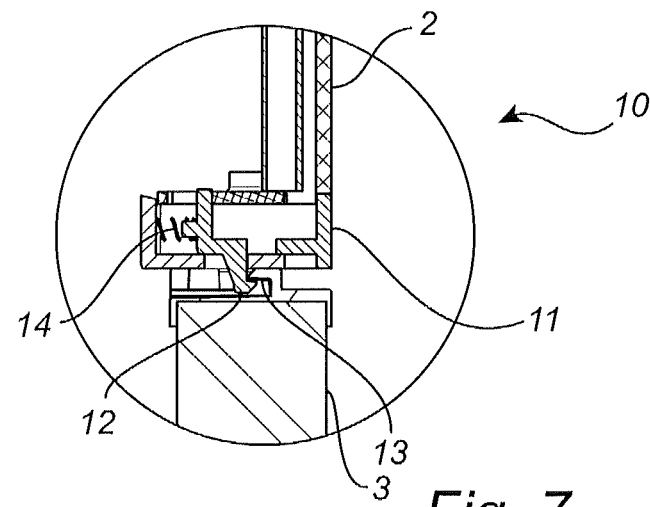
FIG. 7 is an enlarged cross-sectional view of the coupling mechanism of the air purifier device.

The coupling mechanism 10 may comprise two release means 11 (or release actuators) arranged on opposite outer sides of the side wall 5 of the fan unit 2. The release means 11 may e.g. be formed by release buttons, as illustrated in FIGS. 6 and 7. Alternatively, the release means 11 may be formed by e.g. release levers or the like. Each release means 11 may be coupled to a fan engagement part 12 arranged in the fan unit 2 and adapted to engage with a filter engagement part 13 arranged in the filter unit 3. For example, the filter engagement part 13 may comprise a recess and the fan engagement part 12 may be shaped as a hook adapted to mate in the recess, or vice versa. Further, the fan engagement part 12 may be movable by actuation of the release means 11, such as by pushing the release button 11, into an unengaged position, in which the fan engagement part 12 does not engage the filter engagement part 13. In this unengaged position, the fan unit 2 can be removed from the filter unit 3. A resilient means 14, such as a spring, may be arranged to urge the fan engagement part 12 into a position in which it is able to engage the filter engagement part 13 when the fan unit 2 is positioned on the filter unit 3. The fan engagement part 12 may be integrated in the same component as the release means 11, such as moulded in the same piece of plastic.

The filter unit 3 may comprise a geometric feature, such as an edge 15, adapted to mate with a corresponding geometric feature in the fan unit 2 (not shown) for facilitating mating the fan unit 2 in the right position on top of the filter unit 3.

In an embodiment, the whole filter unit 3 may be a disposable. Hence, for changing filter 9 of the air purifier device 1, the whole filter unit 9 may be replaced by a new filter unit. Alternatively, the filter 9 may be removably arranged in the filter unit 3, thereby enabling a user to remove the filter 9 from the filter unit 3 to replace it by a new filter. For example, the filter 9 may be arranged to be slid into the side wall 6 of the filter unit 3, preferably from above in a direction along the longitudinal axis 100 of the air purifier device 1 (not shown).

Figure 8:
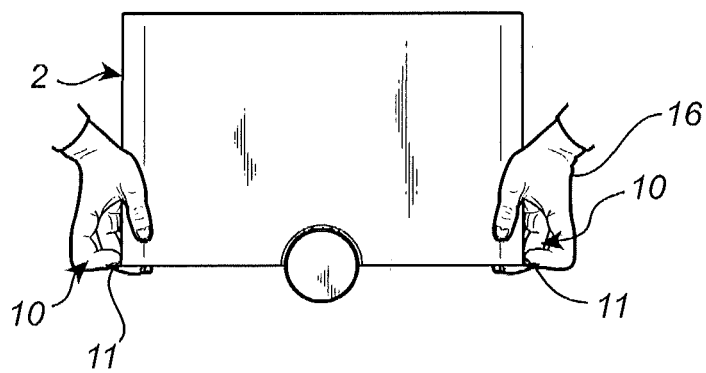
FIG. 8 illustrates the fan unit being removed from the filter unit by a user.
Figure 8:
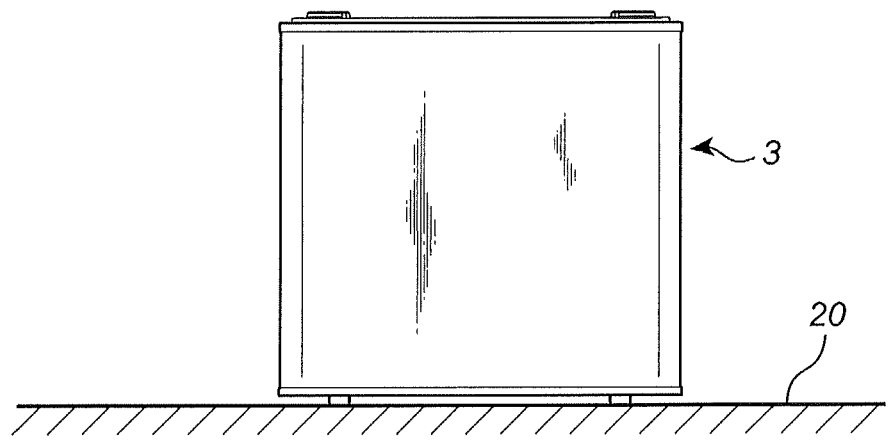

With additional reference to FIG. 8, operation of the coupling mechanism 10 for changing filter 9 will be described. A user 16 may put both hands on opposite sides of the fan unit 2 and simultaneously push (or in any other way actuate) the release means 11 and pinch (or grab) the fan unit 2. When the release means 11 are actuated, the fan engagement part 12 becomes unengaged with the filter engagement part 13, whereby the user 16 may lift the fan unit 2 off the filter unit 3.

The user may then position the fan unit 2 on top of a new filter unit (in case the filter unit 3 is a disposable filter unit 3). Alternatively, the user may remove the filter 9 from the filter unit 3 and insert a new filter (in case merely the filter being disposable).

Then the fan unit 2 may be attached to the filter unit 3 (or on a new filter unit) again. The boxed shape of the fan unit 2 and the filter unit 3 and/or the edge 15 may help (guide) the user to get the fan unit 2 in a correct position on the filter unit 3. Optionally, the release means 11 may be actuated (e.g. pushed) by the user when the fan unit 2 is mated with the filter unit 3 and the released when the fan unit 2 is in position on the filter unit 3. Alternatively, the fan engagement part 12 may comprise a slated edge (as shown in FIG. 7), whereby the fan engagement part 12 may be automatically pushed towards the unengaged position when approaching the recess 13. The user may then not necessarily actuate the release means 11 when putting the fan unit 2 back on top of the filter unit 3.

The person skilled in the art realizes that the present invention by no means is limited to the embodiments described above. On the contrary, many modifications and variations are possible within the scope of the appended claims.

For example, the air purifier device may comprise an alternative ionizing device (or even no ionizing device at all), such as an ionizing device with differently configured emitter electrode, and/or collector plate electrode.

Further, the air purifier device may not necessarily be structurally separated in two parts (fan and filter unit) or may comprise an alternative coupling mechanism (or even no coupling mechanism at all) such as of a screw or bolt type attachment mechanism or any other convenient coupling mechanism.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:
1. An air purifier device, comprising:
a fan arranged to produce an air flow through the air purifier device,
a fan duct for guiding the air flow produced by the fan, the fan duct extending in an upright direction of the air purifier device,
an air intake arranged below a lower end of the fan duct, and
an exhaust arranged at an upper end of the fan duct so as to exhaust purified air in an upward direction from the air purifier device when the air purifier device is in use,
wherein the fan duct flares outward in the radial direction of the fan duct along a direction from an intermediate portion of the fan duct towards the lower end and the fan duct flares outward in the radial direction of the fan duct along a direction from the intermediate portion of the fan duct towards the upper end, and wherein the fan includes blades having a height that is substantially the same as a height of the intermediate portion, so that the blades of the fan in the fan duct do not protrude above or below the intermediate portion in the upright direction.

2. The air purifier device as defined in claim 1, wherein transitions between the intermediate portion and the flared portions of the fan duct are smooth.

3. The air purifier device as defined in claim 1, wherein the fan is centered in the intermediate portion of the fan duct.

4. The air purifier device as defined in claim 1, wherein the intermediate portion of the fan duct has a circular cross-section, and wherein portions of the lower end and upper end of the fan duct have square-like cross-sections.

5. The air purifier device as defined in claim 1, wherein the air intake is arranged to take in air from at least one lateral side of the air purifier device.

6. The air purifier device as defined in claim 1, wherein the air intake is arranged to take in air circumferentially around the lateral sides of the air purifier device.

7. The air purifier device as defined in claim 1, further comprising:
an inlet grille arranged at the lower end of the fan duct, and
an exhaust grille arranged at the upper end of the fan duct, wherein an air intake area of the inlet grille is larger than an air exhaust area of the exhaust grille.

8. The air purifier device as defined in claim 1, further comprising a filter arranged to filter the air flow produced by the fan,
wherein the filter is arranged on an upstream side of the fan duct.

9. The air purifier device as defined in claim 8, further comprising an ionizing device arranged on a downstream side of the fan so as to ionize air in the air flow.

* * * * *